United States Patent
Yoon et al.

(10) Patent No.: US 7,856,176 B2
(45) Date of Patent: Dec. 21, 2010

(54) METHOD AND APPARATUS FOR COMPENSATING HAND-TREMBLING OF CAMERA

(75) Inventors: Young-Kwon Yoon, Seoul (KR); Yong-Gu Lee, Bucheon-si (KR); Byung-Kwon Kang, Suwon-si (KR)

(73) Assignee: Samsung Electronics Co., Ltd., Maetan-Dong, Yeongtong-Gu, Suwon-Si, Gyeonggi-Do (KR)

(*) Notice: Subject to any disclaimer, the term of this patent is extended or adjusted under 35 U.S.C. 154(b) by 205 days.

(21) Appl. No.: 12/169,736

(22) Filed: Jul. 9, 2008

(65) Prior Publication Data

US 2009/0015921 A1    Jan. 15, 2009

(30) Foreign Application Priority Data

Jul. 9, 2007    (KR) .................... 10-2007-0068615

(51) Int. Cl.
*G03B 17/00* (2006.01)
*H04N 5/228* (2006.01)

(52) U.S. Cl. .................. 396/55; 348/208.6; 348/208.12

(58) Field of Classification Search ............. 396/55, 396/52; 348/208.99, 208.1, 208.2, 208.6, 348/208.12; 359/554

See application file for complete search history.

(56) References Cited

U.S. PATENT DOCUMENTS

2006/0114340 A1* 6/2006 Sakurai et al. ............. 348/239

FOREIGN PATENT DOCUMENTS

| CN | 1856031 | 11/2006 |
|---|---|---|
| CN | 1960446 | 5/2007 |
| JP | 06-165047 | 6/1994 |
| KR | 1996-20371 | 6/1996 |
| KR | 1996-36545 | 10/1996 |
| KR | 2004-82645 | 9/2004 |
| KR | 2006-40003 | 5/2006 |
| KR | 2006-71224 | 6/2006 |

* cited by examiner

*Primary Examiner*—Rochelle-Ann J Blackman
(74) *Attorney, Agent, or Firm*—Cha & Reiter, LLC

(57) ABSTRACT

A method and apparatus for compensating hand-trembling of a camera with reduced time required for capture compensated images. The method may include: calculating exposure time proper for preventing hand-trembling using an AE (Automatic Exposure) algorithm during an image-capturing standby mode; executing image-capturing multiple times depending on the exposure time at the time of inputting a photographing signal through a photographing button, and detecting the amount of hand-trembling at each time of image-capturing. The storing of images can be selected by a preset number of required images from the captured images as resultant images, the images being sequentially stored from an image having a lowest amount of hand-trembling as a resultant image, whereby an image with reduced hand-trembling can be obtained.

16 Claims, 4 Drawing Sheets

METHOD AND APPARATUS FOR COMPENSATING HAND-TREMBLING OF CAMERA

CLAIM OF PRIORITY

This application claims the benefit under 35 U.S.C. §119(a) from an application entitled "Method and Apparatus for Compensating Hand-Trembling of Camera" filed in the Korean Intellectual Property Office on Jul. 9, 2007 and assigned Serial No. 2007-68615, the contents of which are hereby incorporated by reference in its entirety.

BACKGROUND OF THE INVENTION

1. Field of the Invention

The present invention relates to a digital camera based on an image sensor, such as a CCD (Charge Coupled Device) or a CIS (CMOS Image Sensor). More particularly, the present invention relates to a method and apparatus for minimizing deterioration of a photographed image caused by user's hand-trembling when photographing using such a digital camera.

2. Description of the Related Art

When a user photographs an image using a digital camera, a hand-trembling phenomenon may occur in the photographed image by user's hand-trembling or unintended movement. There has been research previously conducted on various methods for compensating such a trembling phenomenon. Technologies for compensating such a hand-trembling phenomenon generally employed in the prior art are classified into three technologies, i.e., DIS (Digital Image Stabilization), EIS (Electronic Image Stabilization), and OIS (Optical Image Stabilization). The features of these conventional methods are summarized in Table 1.

detecting the amount of hand-trembling, and an optical correction means for compensating the hand trembling detected by the movement detection means. Therefore, high costs and increased size are inevitable with the OIS technology. Examples of such a technology include Korean Un-examined Patent Publication No. 2006-0071224 entitled "Image Stabilizer for Camera" of Hong-Seok Lee et al., which was filed in the name of Samsung Electronic Co., Ltd. on Dec. 21, 2004, and Korean Un-examined Patent Publication No. 2006-004003 entitled "Apparatus for Compensating Hand-Trembling in Camera Lens Assembly" of Jun-Mo Koo, which was filed in the name of Samsung Electronic Co., Ltd. on Nov. 4, 2004.

Compared to the OIS technology, the DIS technology can assure low H/W cost and small size since detection and compensation of hand-trembling are both achieved by image processing. However, the DIS technology has a problem in that the time the camera requires for photographing the image is relatively long due to the increased amount of calculation, which results from the employment of an image processing S/W for detecting the amount of hand-trembling and for compensating an image. Thus, there is difficulty in capturing an image that quickly changes, as well as having person posing for the additional time required.

Currently available hand-trembling compensating technologies employing an image processing S/W include pixel data movement, a synthesis of multiple short-time exposure images, synthesis of a long-time exposure image with a short-time exposure image, application of an image-trembling compensating filter, etc.

However, due to shortcomings of software technologies developed up to now, deterioration of image quality is inevi-

TABLE 1

| Tech | Detection of Hand-Trembling | Image Compensating | Advantage | Disadvantage | Related KR Unexamined Patent Publication Nos. |
|---|---|---|---|---|---|
| DIS | Comparing two continued images | Image processing | Small size Low cost | Large amount of calculation Long photographing time Deterioration of image quality | 1996-0036545 |
| EIS | Employing movement detection means, such as gyro-sensor | Image processing | Medium or small size Short photographing time as compared to DIS | Deterioration of image quality | 1996-0020371 2004-0082645 |
| OIS | Employing movement detection means, such as gyro-sensor | Optical System Compensating | High image quality Applicable to still image Small amount of calculation | Large size High cost | Lens movement technology: 2006-0071224 Sensor movement technology: 2006-004003 |

As indicated in Table 1, the OIS technology is advantageous in that it is also applicable to still image compensation and is expected to provide a high image quality after compensation. With the OIS technology, however, it is essential to add movement detection means, such as gyro-sensor for table. An example of such a technology is disclosed in Korean Un-examined Patent Publication No. 1996-0036545 entitled "Apparatus for Compensating Hand-Trembling of Camcorder" of Young-Cheol Park, which was filed in the name of Samsung Electronic Co., Ltd. on Mar. 30, 1995.

The EIS technology combines the above-mentioned DIS technology and OIS technology in such a manner that the detection of an amount of hand-trembling is performed using a movement detection means, such as a gyro-sensor, and the compensation of an image is performed using an image processing S/W. As a result, with the EIS technology, it is possible to expect that a result of a middle level between the DIS technology and the OIS technology can be obtained in terms of the length of time and costs for image-capturing, the size of H/W, etc.

However, EIS technology has a disadvantage in that a substantially degraded image is obtained as compared to the OIS because it employs an image processing S/W like the DIS technology. Examples of such a technology includes Korean Un-examined Patent Publication No. 1996-0020371 entitled "Method and Apparatus for Compensating Hand-Trembling of Camcorder" of Nam-Soo Lee, which was filed in the name of LG EI on Nov. 21, 1994, and Korean Un-examined Patent Publication No. 2004-0082645 entitled "An Image Acquisition System Capable of Obtaining Stabilized Image and Method of Stabilizing Image" of Yong-Cheol Cho, which was filed in the name of Samsung Electronic Co., Ltd. on Mar. 19, 2003.

Beyond the above-mentioned hand-trembling compensating technologies, also known is an increasing sensitivity of an image sensor (e.g. change ISO 100 into ISO 400 with regard to the sensitivity of an image sensor) so as to reduce exposure time, thereby avoiding hand-trembling problems, and a remote exposure button technology employing a remote controller for exposing a shutter so as to reduce the hand-trembling effect. However, the increasing sensitivity of an image sensor has a problem in that image quality is deteriorated due to noise, and the remote exposure button technology has a problem in that user's convenience is made worse, and it is impossible to avoid hand-trembling caused by an action beyond shutter pressing.

In addition, the best picture function, which provides a number of pictured images so as to allow a user to choose one or more desired pictures, may be considered as conducting a role of reducing hand-trembling problems. However, with this technology, a user's inconvenience is caused because the user must select the image from one or more photographs. Furthermore, it is difficult for the user to determine a hand-trembling level and to choose images pictured without hand-trembling from high-pixel images displayed through a small LCD window.

Consequently, there is a need in the art to provide a technology of minimizing deterioration of image quality caused by hand-trembling without deteriorating a user's convenience.

SUMMARY OF THE INVENTION

Accordingly, the present invention provides a method and apparatus for minimizing deterioration of photographed images caused by hand-trembling in a digital camera utilizing an image sensor, such as a CCD (Charge Coupled Device) or a CIS (CMOS Image Sensor).

According to an exemplary aspect of the present invention, there is provided a method for compensating hand-trembling of a camera including the steps of: calculating a proper exposure time for preventing hand-trembling using an Automatic Exposure (AE) algorithm during an image-capturing standby mode; executing image-capturing multiple times based on the exposure time at the time of inputting a photographing signal through a photographing button, and detecting an amount of hand-trembling at each instance of image-capturing; and storing images selected from the captured images by a preset number of required images as resultant images, the selected images being sequentially stored from an image with a relatively lesser amount of hand-trembling. The number of required images may be set to one, so that the image with the least amount of hand-trembling is stored as the final resultant image.

Alternatively, in the present invention the number of required images may be set to more than one, for explanatory purposes only, to between 2 to 8. In such a case, the inventive method may further include the step of synthesizing resultant images with each other, thereby producing the final resultant image. The proper exposure time for preventing hand-trembling may be, for example in the range of about $1/10$ sec to $1/30$ sec. If the calculated exposure time is not the proper exposure time, the exposure time is calculated again after the ISO is increased. If the image-capturing is performed multiple times, a number of times of image-capturing is set in such a manner that the total photographing time does not exceed, for example, about 1 sec. In the step of detecting the amount of hand-trembling for each captured image, the amount of blur may be additionally detected for each captured image. In addition, in the step of storing the preset number of required images as the resultant images sequentially from an image with the lowest amount of hand-trembling, the images may be stored as the resultant images sequentially from a less deteriorated image in consideration of the amount of blur in addition to the amount of hand-trembling.

According to another exemplary aspect of the present invention, there is provided an apparatus for compensating hand-trembling of a camera including: a camera optical system for copying image information of an object; an image sensor for converting the image information copied by the camera optical system into an electronic signal; a signal processor for restoring the electronic signal into the image information; an image storage unit for storing temporary information during the restoration into the image information, and final image data; a hand-trembling detector for detecting a hand-trembling level in the camera system at the time of image-capturing; an image-capturing controller for controlling the operation of each of the above-mentioned components at the time of compensating the hand-trembling of the camera, wherein the image-capturing controller selects images by a preset number of required images from the images captured by performing image-capturing multiple times at the time of inputting photographing signals through a photographing button, and stores the selected images in the image storage unit as resultant images sequentially from an image with the lowest amount of hand-trembling.

The apparatus may further include, for example, an image compensating unit for synthesizing resultant images with each other, thereby producing the final resultant image. The hand-trembling detector may comprise of a gyro-sensor. In addition, the hand-trembling detector may be implemented in a digital type employing an image process. When the image-capturing is performed multiple times, the number of times of image-capturing may be set in such a manner that the total photographing time does not exceed 1 sec. The image-capturing controller stores, for example, 2 to 8 images with a relatively lower amount of hand-trembling in the image storage unit as resultant images.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
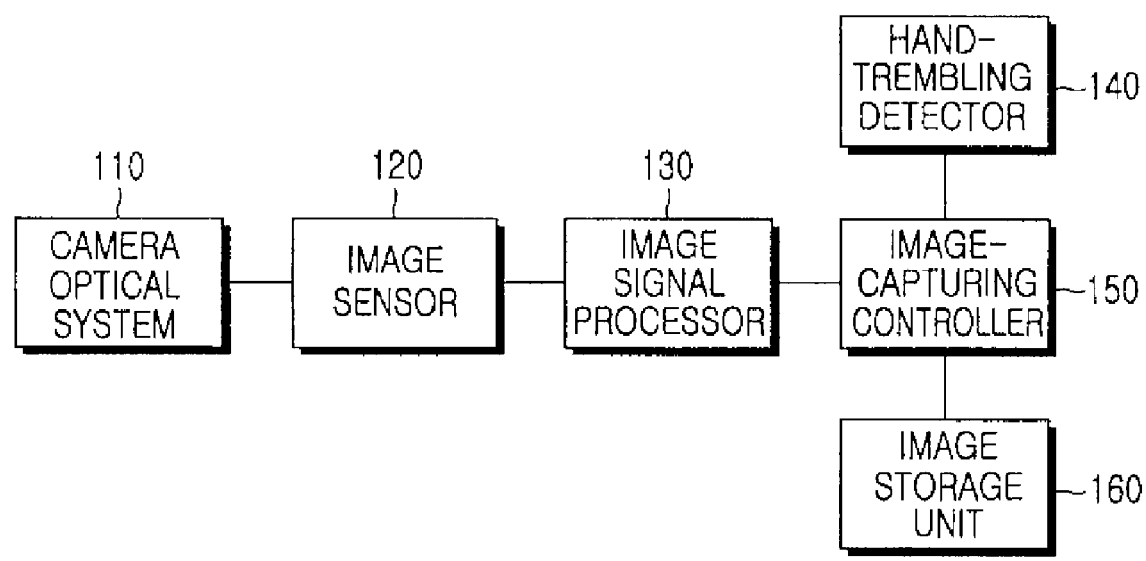
FIG. 1 is a block diagram showing a construction of an apparatus for compensating hand-trembling of a camera according to an exemplary embodiment of the present invention.

Hereinafter, the exemplary embodiments of the present invention will be described with reference to the accompanying drawings. It should be noted that in the following description, the same elements will be designated by the same reference numerals even though they are shown in different drawings. In addition, in the following description of the present invention, a detailed description of known functions and configurations incorporated herein will be omitted when it may obscure appreciation of the subject matter of the present invention by a person of ordinary skill in the art.

The present invention provides a method and apparatus for reducing hand-trembling of a digital camera at the time of photographing. The present invention also provides a method using a proper exposure time for reducing hand-trembling in a digital camera at the time of photographing, rendering multiple image-capturing operations to be continuously performed in the camera through a single inputting operation through a photographing button, inspecting the amount of hand-trembling at the time of each image-capturing operation, and providing a captured image with the lowest amount of hand-trembling as a resultant image, whereby an image with reduced hand-trembling can be obtained.

An exemplary embodiment of the present invention is described in detail with reference to FIG. 1.

FIG. 1 is a block diagram showing an exemplary construction of an apparatus for compensating hand-trembling of a camera according to an embodiment of the present invention. Referring to FIG. 1, the apparatus for compensating hand-trembling of a camera according to the present exemplary embodiment includes: a camera optical system 110 for copying image information of an object to an image sensor 120, the image sensor 120 for converting the copied image information into an electronic signal; an image signal processor 130 for restoring the converted electronic signal to the image information; an image storage unit 160 for storing temporary information data during the restoration of the converted electronic signal to the image information, and the final image data; a hand-trembling detector 140 for detecting the hand-trembling level of a camera system; and an image-capturing controller 150 for controlling the operation of each of the above-mentioned components at the time of image-capturing of the camera.

The hand-trembling detector 140 may be implemented in an electronic type employing, for example, a gyro-sensor, or in a digital type employing, for example, an image process.

Figure 2:
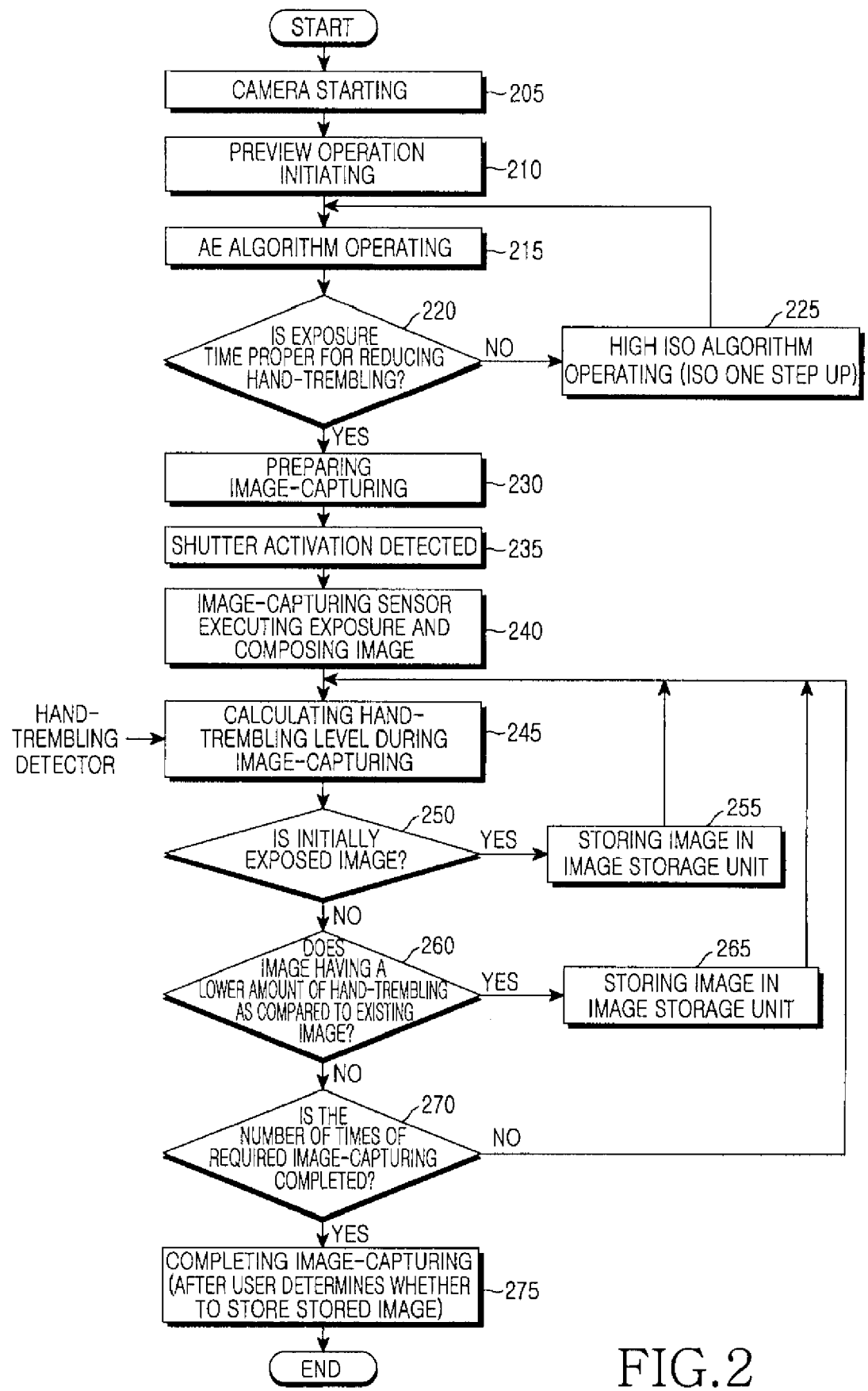
FIG. 2 is a flowchart of a method for compensating hand-trembling of a camera according to another exemplary embodiment of the present invention.

FIG. 2 is a flowchart of an exemplary method for compensating hand-trembling of a camera according to another exemplary embodiment of the present invention. As shown in FIG. 2, the method according to the present exemplary embodiment includes a digital camera starting at step 205, and initiating a preview operation at a photographing stand-by mode at step 210. At step 215, exposure time is calculated using an Automatic Exposure (AE) algorithm.

The AE algorithm used is known in the art such that an exposure value (EV) specifies the relationship between the f-number, F, and the exposure duration, T:

$$EV = \log_2\left(\frac{F^2}{T}\right) = 2\log_2(F) - \log(T)$$

The exposure value [1] becomes smaller as the exposure duration increases, and it becomes larger as the f-number grows.

At step 220, it is determined whether the exposure time calculated by the AE algorithm at step 215 is the proper exposure time for preventing hand-trembling effects on image quality or not.

The proper exposure time for preventing hand-trembling effects on image quality means a length of time not exceeding the critical exposure time calculated through a preliminary test in the present invention. The critical exposure time is a condition which renders probability of obtaining images free of hand-trembling statistically not less than several tens percent (%) when image-capturing is performed with the critical exposure time. The preferred critical exposure time in this example is varied within the range of about 1/10 to 1/30 sec depending on camera H/W, such as an image sensor, a camera optical system, and a camera circuit. Beyond this, the critical exposure time may also be varied depending on a target hand-trembling reducing specification, and the number of times of repeating image-capturing for reducing hand-trembling.

If it is determined that the exposure time is the proper exposure time for preventing hand-trembling effects at step 220, the process proceeds to step 230. However, if it is determined that the exposure time is not the proper exposure time for preventing hand-trembling effects at step 220, the process proceeds to step 225, at which step the ISO is increased by one step, and returns to step 215, at which step the exposure time is calculated again with the AE algorithm.

Typically, under a photographing condition with high illumination, the exposure time calculated by the AE algorithm is sufficiently short, so that it will be the proper exposure time for preventing hand-trembling. However, under a photographing condition with low illumination, the calculated exposure time is extended, so that it may be determined as the improper exposure time. In such a case, an operation for increasing the ISO of the camera is performed so that the exposure time calculated by the AE algorithm can be reduced, and the above-mentioned procedure is repeated from the AE calculation until the exposure time arrives at the value proper for reducing hand-trembling effects.

If the above-mentioned procedure is terminated, a condition enabling image-capturing is obtained, and the image-capturing is prepared at step 230. Next, if there is detection of a shutter activation at step 235 typically via an image capturing button, an image-capturing sensor executes exposure and composes an image at step 240. At step 250, the hand-trembling detector 140 detects the amount of hand-trembling effects occurring during image-capturing.

Next, it is determined whether a captured image is an initial image or not at step 250. If it is determined that the captured image is the initial image, the process proceeds to step 255, at which step the initially captured image and the amount of the corresponding image detected at step 245 are stored in the image storage unit 160, and the process proceeds to step 245.

If it is determined that the captured image is not the initial image at step 250, the process proceeds to step 260, at which step the amount of hand-trembling effects of the image stored in the image storage unit 160 and the amount of hand-trembling effects of a currently captured image are compared with each other. If the amount of hand-trembling effects of the currently captured image is lower than the amount of hand-trembling effects of the image stored in the image storage unit 160, the process proceeds to step 265, at which step the newly captured image and the amount of hand-trembling effects thereof are stored in the image storage unit 160, thereby updating the image storage unit 160.

At step 260, if it is determined that the amount of hand-trembling effects of the currently captured image is higher than the amount of hand-trembling effects of the image previously stored in the image storage unit, the process proceeds to step 270, at which step it is determined whether the number of times of image-capturing is equal to the preset number of times of required image-capturing or not. If the number of times of current image-capturing is lower than the number of times of required image-capturing, the process returns to step 245 again, and the above-mentioned procedure is repeated. The number of times of required image-capturing is set to the number of times that is sufficient for statistically ensuring the possibility for user to obtain an image with reduced hand-trembling in consideration of probability capable of obtaining an image free of hand-trembling when the user photographs using the critical exposure time determined at a preliminary test according to the present invention, and that does not make the user feel inconvenience due to excessively long total photographing time.

For example, with a camera operating at 15 fps, if the number of times of required image-capturing is set to 10, the total photographing time may be equal to or less than 1 sec. Therefore, the set number of times of required image-capturing may be considered desirable.

If it is determined that the number of times of current image-capturing is equal to the number of the preset number of times of required image-capturing at step 270, the process proceeds to step 275, at which step it is determined whether the final image stored in the image storage unit 160 is stored or not, and the image-capturing operation is terminated. The image stored in the image storage unit 160 after the preset number of times of required image-capturing has been completed will be the final image captured with the minimum hand-trembling among the images repeatedly captured over the number of times of required image-capturing.

The method of compensating hand-trembling according to the present exemplary embodiment can produce a final image with reduced hand-trembling effects according to the above-mentioned operating flow because the exposure time and the number of times of repeating are set to a condition that statistically enables an image to be obtained with reduced hand-trembling.

It is possible to add an image compensating process employing an image synthesizing technology to the method of compensating hand-trembling described above.

Now, another exemplary embodiment of the present invention employing an image synthesizing technology will be described with reference to FIG. 3.

Figure 3:
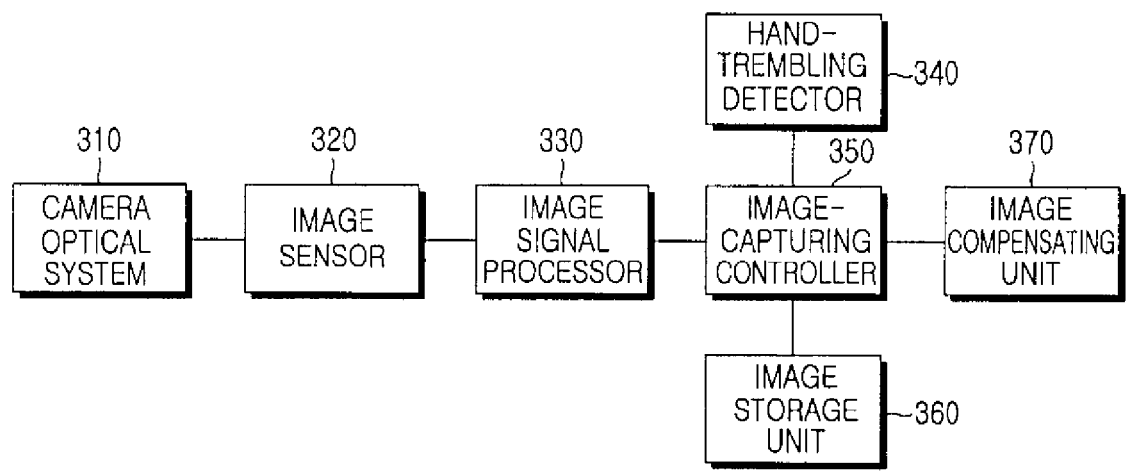
FIG. 3 is a block diagram showing a construction for compensating hand-trembling of a camera according to another exemplary embodiment of the present invention.

FIG. 3 is a block diagram showing a construction of a band-trembling compensating apparatus for a camera according to another exemplary embodiment of the present invention. Referring to FIG. 3, the hand-trembling compensating apparatus of the present exemplary embodiment includes: a camera optical system 310 for copying image information of an object to an image sensor 320, the image sensor 320 converting the copied image information into an electronic signal; an image signal processor 330 for restoring the converted electronic signal to the image information; an image storage unit 360 for storing temporary information during the restoration of the image information and the final image data; a hand-trembling detector 340 for detecting the level of hand-trembling of a camera system; an image correction unit 370 for synthesizing the image data stored in the image storage unit 360 after the image-capturing operation so as to produce a final resultant image; and an image-capturing controller 150 for controlling the operation of each of the above-mentioned components at the time of image-capturing of the camera.

The band-trembling detector 140 may be implemented either in an electronic type employing a gyro-sensor, or in a digital type employing an image process.

In the prior art, it was impossible for a hand-trembling image processing S/W based on image synthesis to avoid deterioration of an image after synthesis because blur in the original image caused by hand-trembling effects prior to the synthesis is partially included in the synthesized image. However, according to the present embodiment, images with reduced hand-trembling effects are extracted by a predetermined required number (typically two to eight images) and then the extracted images are synthesized with each other, whereby it is possible to obtain an image which is substantially improved as compared to an image, the hand-trembling of which is corrected by the existing image processing S/W.

In another exemplary embodiment of the present invention, a final image is obtained by acquiring a predetermined number of images, the hand-trembling effects of which has been reduced according to the characteristics of the present invention, and then by synthesizing the acquired images with each other. The present invention is advantageous in that deterioration of image quality, which may be caused at the time of high ISO operation, can be suppressed.

A method of compensating for hand-trembling according to the present exemplary embodiment will be described with reference to FIG. 4.

Figure 4:
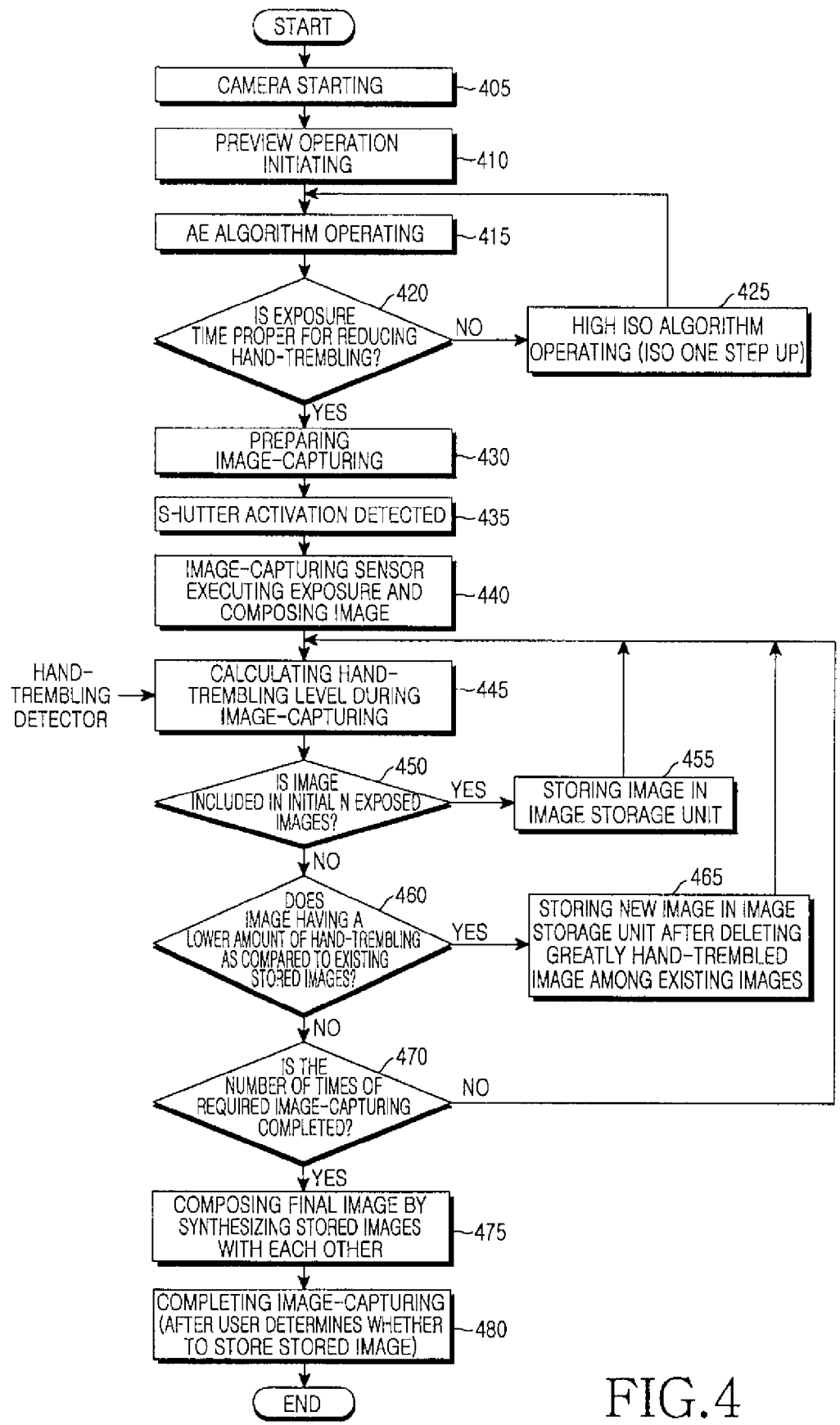
FIG. 4 is a flowchart of a method of compensating hand-trembling of a camera according to another exemplary embodiment of the present invention.

FIG. 4 is a flowchart of a method of compensating hand-trembling of a camera according to another exemplary embodiment of the present invention. As shown in FIG. 4, the present exemplary embodiment includes a digital camera starting at step 405, and initiates a preview operation at a photographing stand-by mode at step 410.

At step 415, exposure time is calculated using an AE algorithm. At step 420, it is determined whether the exposure time calculated by the AE algorithm at step 415 is the exposure time proper for preventing hand-trembling or not. The exposure time proper for preventing hand-trembling effects means a length of time not exceeding a critical exposure time determined through a preliminary test in the present invention. The preferred critical exposure time is a condition for rendering the provability of obtaining images free of hand-trembling effects to be statistically not less than several tens of percentage (%) when image-capturing is performed with the critical exposure time, and is varied in the range of about $1/10$ sec to $1/30$ sec depending on camera H/W, such as an image sensor, a camera optical system, a camera circuitry, etc. In addition, the critical exposure time can be varied according to a target specification for reducing hand-trembling effects, and the number of times of repeating image-capturing for reducing hand-trembling effects.

If it is determined that the proper exposure time for preventing hand-trembling effects at step 420, the process proceeds to step 430. However, if it is determined that the proper exposure time for preventing hand-trembling effects has not been reached at step 420, the process proceeds to step 425, at which step the ISO is increased by one step, and returns to step 415, at which step the exposure time is calculated again by the AE algorithm.

Under a photographing condition with high illumination, the exposure time calculated by the AE algorithm is typically short enough to be the exposure time proper for reducing hand-trembling. However, under a photographing condition with low illumination, the calculated exposure time is extended, and may be deemed as an improper exposure time. In that event, an operation for increasing the ISO of the camera so that the exposure time is calculated by the AE algorithm, and the above-mentioned procedure is repeated from the AE calculation until the exposure time becomes a value proper for reducing hand-trembling effects on image quality.

If the above-mentioned procedure is completed, a condition allowing image-capturing is obtained, so that image-capturing is prepared at step 430. Then, upon detecting activation of the shutter via the image-capturing button at step 435, an image-capturing sensor executes exposure and composes an image. At step 445, a hand-trembling detector detects the amount of hand-trembling occurring during image-capturing.

Then, in order to store initially captured images in the image storage unit 360 by a predetermined required number (n), it is determined whether a currently captured image is included in the predetermined required number (n) of the initially captured images or not. If it is determined that the currently captured image is included in n initially captured images, the process proceeds to step 455, at which step the currently captured image and the amount of hand-trembling of the currently captured image detected at step 445 are stored in the image storage unit 360, and then the process returns to step 445.

However, if it is determined that the currently captured image is not included in the predetermined required number (n) of images at step 450, the process proceeds to step 460, at which step the image with the highest amount of hand-trembling among the number of required images stored in the image storage unit 360 (shown in FIG. 3) is compared with the currently captured image in terms of the amount of hand-trembling.

If the amount of hand-trembling effects of the currently captured image is lower than the amount of hand-trembling effects of the image with the highest amount of hand-trembling, the process proceeds to step 465, at which step the image with the highest amount of hand-trembling among the images stored in the image storage unit 360 is deleted, and then the newly captured current image and the amount of hand-trembling thereof are stored in the image storage unit 360, thereby updating the information.

If it is determined that the amount of hand-trembling effects of the currently captured image is higher than the amount of hand-trembling of the image with the highest amount of hand-trembling among the images previously stored in the image storage unit 360 at step 460, the process proceeds to step 470, at which step it is determined whether the number of times of current image-capturing is equal to the predetermined number of times of required image-capturing.

If the number of times of current image-capturing is less than the number of times of required image-capturing, the process returns to step 445, and the above-mentioned procedure is repeatedly performed. The number of times of required image-capturing is set to the number of times that is sufficient for statistically ensuring the possibility for user to obtain an image with reduced hand-trembling effects in consideration of probability capable of obtaining an image free of hand-trembling effects when the user photographs using a critical exposure time determined at a preliminary test according to the present invention, and that does not make the user feel inconvenience due to an excessively long total photographing time.

For example, with a camera operating at 15 fps, if the number of times of required image-capturing is set to 10, the total photographing time may be equal to or less than 1 sec. Therefore, the preset number of times of required image-capturing may be considered as being desirable.

If it is determined that the number of times of current image-capturing is equal to the preset number of times of required image-capturing at step 470, the process proceeds to step 475, at which step the images stored in the image storage unit are synthesized with each other, thereby composing the final image.

Next, the process proceeds to step 480, at which step it is determined whether the final image stored in the image storage unit 360 is stored or not, and the image-capturing operation is terminated.

After the preset number of times of required image-capturing is completed, the images stored in the image storage unit 360 are n images stored sequentially from an image with a relatively lower amount of hand-trembling among the repeatedly captured images during the number of times of required image-capturing. At step 475, the n images are synthesized with each other, and the final image is produced. The method of compensating hand-trembling according to the present embodiment can produce the final image with reduced hand-trembling according to the above-mentioned operating flow because the exposure time and the number of times of repeating are set to a condition that statistically enables an image to be obtained with reduced hand-trembling.

In the above-mentioned exemplary embodiments, whether to store a captured image is determined on the basis of the amount of hand-trembling measured while the corresponding image is being captured. However, it is possible to determine whether to store a captured image on the basis of one or more characteristics of the image itself, such as the amount of blur in the image or the like.

In other words, it is possible to use the amount of blur as the basis for determining whether to store a captured image through the quantification of blur in the image. The quantification of blur may be made by comparing the signal magnitudes of components of frequencies similar to a pixel space frequency. For example, if two images are obtained by photographing the same object, the image with a higher high frequency signal magnitude can be determined as having a lower amount of blur. If desired, it is also possible to determine whether to store an image in consideration of both of the amount of blur and the amount of hand-trembling effects.

According to the present invention, it is possible to obtain an image free of hand-trembling effects with minimized degradation of image quality without deteriorating the user's convenience by changing an image-capturing algorithm in a digital camera based on an image sensor, such as a CCD (Charge Coupled Device) or a CIS (CMOS Image Sensor).

While the invention has been shown and described with reference to certain preferred exemplary embodiments thereof it will be understood by those skilled in the art that various changes in form and details may be made therein without departing from the spirit and scope of the invention as defined by the appended claims.

For example the term "proper exposure" which is used in the art, may be varied outside a preferred range and still within the spirit and scope of the presently claimed invention. In addition, while the images can be stored in a predetermined order, typically starting with the image having the lowest amount of hand-trembling effects, the predetermined order could be in any logical order (reverse order, for example) or the images could be labeled in memory with an identifier that, for example, starts with the image having the least amount of hand-trembling effects and sequentially increases the identification number with increased hand-trembling effects.

What is claimed is:

1. A method of compensating for hand-trembling effects of a camera comprising the steps of:

Calculating an exposure time for preventing hand-trembling using an Automatic Exposure (AE) algorithm during an image-capturing standby mode, executing image-capturing for a plurality of images within the calculated exposure time in response to detecting actuation of a photographing button, detecting an amount of hand-trembling effects at each image;

sorting the images in a sequential order from a lowest amount of hand-trembling effects; and storing images selected by a preset number of required images from the captured images as resultant images in the sequential order.

2. The method of claim 1, wherein the number of required images is set to one, and the hand-trembled image with the lowest amount of hand-trembling effects is stored as the final resultant image.

3. The method of claim 1, wherein the number of required images is set between 2 to 8.

4. The method of claim 3, further comprising the step of synthesizing resultant images with each other, thereby producing the final resultant image.

5. The method of claim 1, wherein the calculated exposure time is in the range of 1/10 sec to 1/30 sec.

6. The method of claim 1, wherein the exposure time being adjusted to be within a predetermined limit by increasing sensitivity of an image sensor.

7. The method of claim 1, wherein, when image-capturing is performed for said plurality of times, a total number of said plurality of times of image-capturing is set so a total photographing time does not exceed about 1 sec.

8. The method of claim 1, wherein, in the step of detecting the amount of hand-trembling effects for each captured image, an amount of blur is additionally detected for each captured image.

9. The method of claim 1, wherein, in the step of detecting the amount of hand-trembling effects for each captured image, an amount of blur is additionally detected for each captured image; and wherein, in the step of storing the preset number of required images as the resultant images sequentially from an image with the lowest amount of hand-trembling effects, the images are stored as the resultant images sequentially from a less deteriorated image in consideration of the amount of blur, in addition to the amount of hand-trembling.

10. An apparatus for compensating for hand-trembling of a camera comprising:

a camera optical system for copying image information of an object;

an image sensor for converting the image information copied by the camera optical system into an electronic signal;

a signal processor for restoring the electronic signal into the image information;

an image storage unit for storing temporary information during the restoration into the image information, and final image data;

a hand-trembling detector for detecting a hand-trembling level in the camera system at the time of image-capturing;

an image-capturing controller for controlling the operation of each of the above-mentioned components at the time of compensating for hand-trembling in the camera, wherein the image-capturing controller a preset number of required images from the images captured during the exposure time by performing image-capturing multiple times at the time of inputting photographing signals through a photographing button, sorts the images in a sequential order from a lowest amount of hand-trembling effects and stores the selected images into the image storage unit as resultant images in the sequential order.

11. The apparatus of claim 10, wherein the number of required images is set to one, and the image with the lowest amount of hand-trembling level is stored as the final resultant image.

12. The apparatus of claim 10, wherein the number of required images is set between 2 to 8.

13. The apparatus of claim 12, further comprising an image compensating unit for synthesizing resultant images with each other for producing the final resultant image.

14. The apparatus of claim 10, wherein the hand-trembling detector comprises a gyro-sensor.

15. The apparatus of claim 10, wherein the hand-trembling detector is implemented in a digital type employing an imaging process.

16. The apparatus of claim 10, wherein when image-capturing is performed for a plurality times, a total number of times of image-capturing is set so a total photographing time does not exceed 1 sec.

* * * * *